(12) United States Patent
Koh et al.

(10) Patent No.: US 7,796,893 B2
(45) Date of Patent: Sep. 14, 2010

(54) OPTICAL BI-DIRECTIONAL TRANSCEIVER MODULE

(75) Inventors: Han-Jun Koh, Gyeonggi-do (KR); Jae-Oh Byun, Chungcheongnam-do (KR)

(73) Assignees: Luxpert Technologies Co., Ltd., Seoul (KR); Package and Solution Inc., Gwangju (KR)

( * ) Notice: Subject to any disclaimer, the term of this patent is extended or adjusted under 35 U.S.C. 154(b) by 533 days.

(21) Appl. No.: 11/812,070

(22) Filed: Jun. 14, 2007

(65) Prior Publication Data

US 2008/0310853 A1 Dec. 18, 2008

(51) Int. Cl.
*H04B 10/00* (2006.01)

(52) U.S. Cl. ........................ 398/139; 398/136

(58) Field of Classification Search ................. 398/135, 398/136, 138, 139
See application file for complete search history.

(56) References Cited

U.S. PATENT DOCUMENTS

| | | | |
|---|---|---|---|
| 6,075,635 A | 6/2000 | Butrie et al. | |
| 6,939,058 B2 | 9/2005 | Gurevich et al. | |
| 2005/0158054 A1* | 7/2005 | Lo et al. | 398/138 |
| 2007/0071444 A1* | 3/2007 | Okada et al. | 398/135 |
| 2007/0183784 A1* | 8/2007 | Lee et al. | 398/135 |
| 2008/0212973 A1* | 9/2008 | Song et al. | 398/139 |

FOREIGN PATENT DOCUMENTS

KR   A 2003-0063085   7/2003

* cited by examiner

*Primary Examiner*—Nathan M Curs
(74) *Attorney, Agent, or Firm*—Oliff & Berridge, PLC

(57) ABSTRACT

An optical bi-directional transceiver module is disclosed. The optical bi-directional transceiver module is suitable for an optical transmission/reception operation on the condition that an interval between two wavelength bands such as C and L bands is very narrow. The transceiver module manufactures a stable optical-communication light source based on the injection-mode-locked FP LD, such that an improved light source capable of substituting for the conventional high-quality DFB laser can be implemented. As a result, the light source for the WDM-PON system can be manufactured. The optical bi-directional transceiver module can be manufactured even when the light signal having a narrow interval between two wavelength bands is used, resulting in reduction of costs, size, and power consumption of the light source.

9 Claims, 6 Drawing Sheets

OPTICAL BI-DIRECTIONAL TRANSCEIVER MODULE

BACKGROUND OF THE INVENTION

1. Field of the Invention

The present invention relates to an optical bi-directional transceiver module, and more particularly to an optical bi-directional transceiver module suitable for an optical transmission/reception operation on the condition that an interval between two wavelength bands such as C and L bands is very narrow.

2. Description of the Related Art

The competitiveness of the countries in the $21^{st}$ century information society can be improved by not only the expansion of an optical communication infra-structure, but also easier access/usage by the general public.

The optical communication technology can be gradually developed to widely accommodate the extensibility of a communication network and the capacity for preparing the service for the variable demand. With the increasing development of the optical communication technology, an optical communication system is being designed in the form of an integration circuit capable of implementing a wavelength division multiplex (WDM) system at a high speed. As a result, the development of the optical communication technology is being required for a variety of technical fields.

The most favorable scheme from among a variety of methods of the basic structure of the passive optical network (PON) is an FTTx scheme based on ATM passive optical network (A-PON) proposed by a full service access network (FSAN) created in 1995. The FTTx scheme has been developed for the Gigabit Ethernet PON (GE-PON), and has been made commercially available.

In addition, a WDM-PON system for providing a large number of services and the ultimate access network service can provide subscribers or users with the highest-quality access network service due to a wavelength re-set function, and can configure a flexible network, such that many developers or companies are conducting intensive research into the WDM-PON system and associated technology.

The WDM-PON system arranges N optical transceivers such as N optical network units (ONUs) on an optical line terminal, and performs wavelength division of downlink and uplink signals using an optical router at the OLTs and a remote node in order to multiplex the downlink and uplink signals, such that the multiplexed signals are transmitted to a destination.

The WDM-PON network requires the low-priced single wavelength light-sources technology, such that it is the most important technology capable of implementing the WDM optical communication technology at the metro and access networks.

The optical module from among overall constituent elements of the system is the most difficult technology, such that it encounters the bottle-neck of a variety of developing processes, and greatly affects the costs of the system hardware.

A conventional Fabry-Perot laser system can be easily manufactured by a simple fabrication process, and has a high production yield, such that it is widely used for a low-speed access network. However, as the transfer rate becomes higher and the WDM-PON system is generalized, the 32-channel or 64-channel single wavelength laser system is required.

Presently, the DFB laser system equipped with a diffraction grating including a resonator has been widely used, however, it should be noted that the DFB laser system has a complicated manufacturing process and a low production yield. Therefore, many developers are conducting intensive research into a method for adapting several semiconductor lasers, each of which has a simple manufacturing process and the high-quality optical characteristics, to the PON system.

Since the uncooled-type DFB LD system can be manufactured with the relatively-low costs as stated above, it is suitable for a mass-manufacturing process, and the fabrication process and package can be made commercially available, such that it can be easily used by users.

However, the uncooled-type DFB LD abruptly changes unique wavelength and optical output characteristics according to temperature, its operation characteristics have the high dependence on temperature, and the costs of the uncooled-type DFB LD are relatively higher than those of the GE-PON system.

The cooled-type DFB LD can be easily manufactured by a simple process, such that it is suitable for a mass-manufacturing process, and has superior wavelength adjustment characteristics in the case of a narrow interval between channels. In addition, the cooled-type DFB LD has a complicated package process of the high costs, such that it is difficult to be applied to an access network.

The VCSEL does not require a fine arrangement process for an optical fiber, has low power-consumption characteristics, and can estimate wafer-level element characteristics. However, the VCSEL has difficulty in maintaining the above-mentioned characteristics, such that it is unable to be used as the light source of the WDM-PON system.

The DBR LD has superior wavelength variability and single wavelength characteristics. However, it has a complicated process and a complicated driving circuit such that it is manufactured with very expensive cost. As a result, the DBR LD is also unable to be used as the light source of the WDM-PON system.

The External Cavity Laser (ECL) has low optical output characteristics due to the mode transition phenomenon and the structural problem of an external resonator. However, the ECL has a low temperature-dependency and can easily adjust the wavelength without using the TEC, and can test the level of individual components. Also, the ECL is manufactured with low costs such that it can be suitable for the system such as the PON system. As a result, many developers are conducting intensive research into the ECL due to the above-mentioned advantages. However, indeed, the ECL is unable to be easily applied to the WDM-PON system, because it must satisfy the maintenance and operation encountered by the fixed wavelength of the ONU and must guarantee the optical transceiver module of a variety of wavelengths.

In the light of advantages and disadvantages of the above-mentioned light sources, it is difficult to search for the optimum solution for a low-priced optical transceiver module capable of being used for the PON system. Recently, an improved WDM-PON technology based on an injection mode locked FP LD proposed by Novera Corporation has been disclosed in the Korean Patent Laid-open Publication No. 2003-63085 issued on Jul. 28, 2003.

However, the conventional WDM-PON optical transceiver module has an optical transmitter and an optical receiver separated from each other. The optical transmitter and the optical receiver are coupled to each other by the fusion splice, and are finally mounted to a driving circuit and a receiving circuit, resulting in the occurrence of the complicated structure. As a result, due to the complicated structure, the increasing costs of the above-mentioned WDM-PON optical transceiver module are inevitable, and the WDM-PON optical transceiver module cannot be manufactured in the form of a small-sized product.

Figure 1:
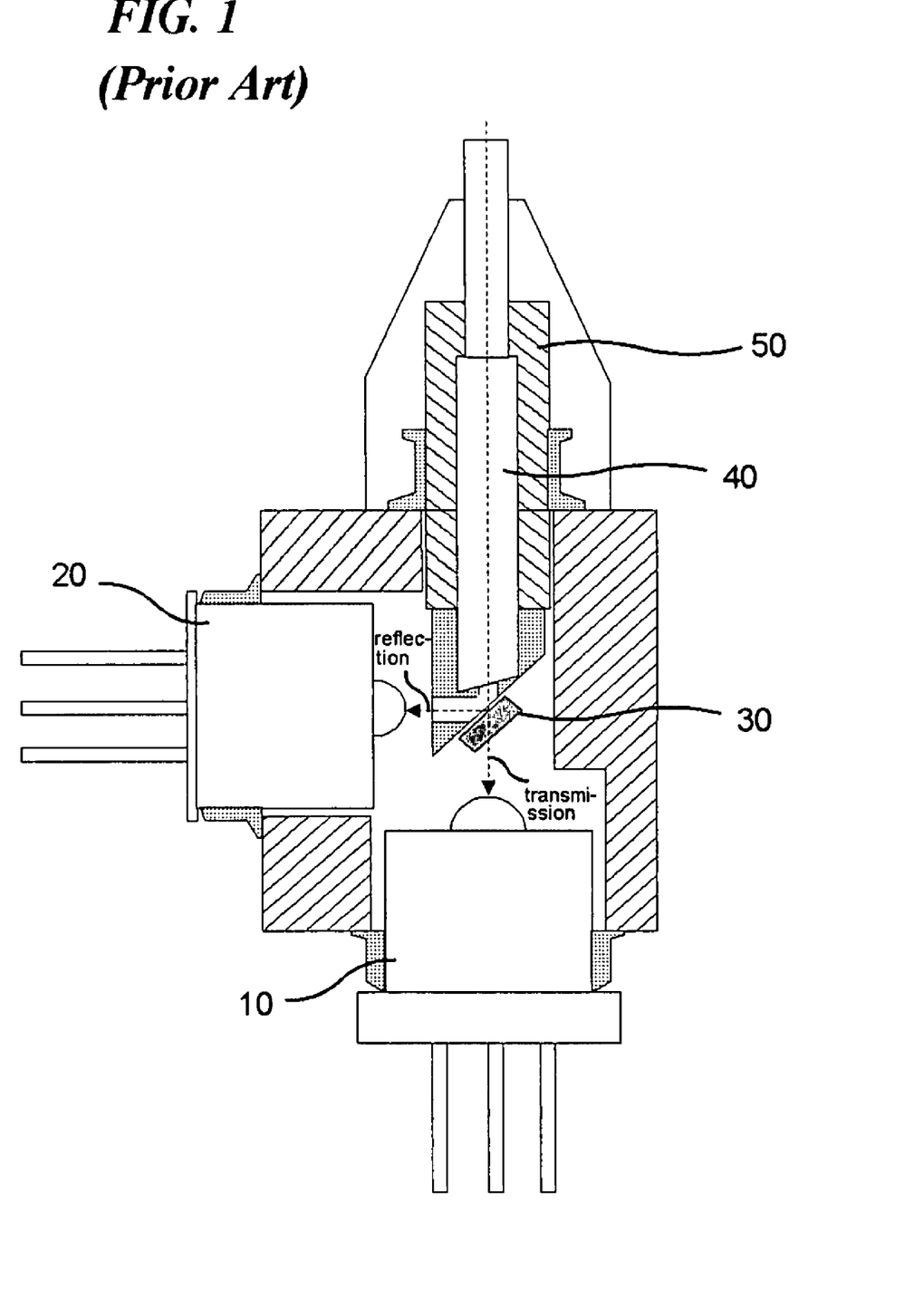
FIGS. 1~3 are conceptual diagrams illustrating a conventional optical bi-directional transceiver module.

In order to solve the above-mentioned problems, the bi-directional module shown in FIG. 1 has been proposed by the WDM-PON system.

Figure 2:
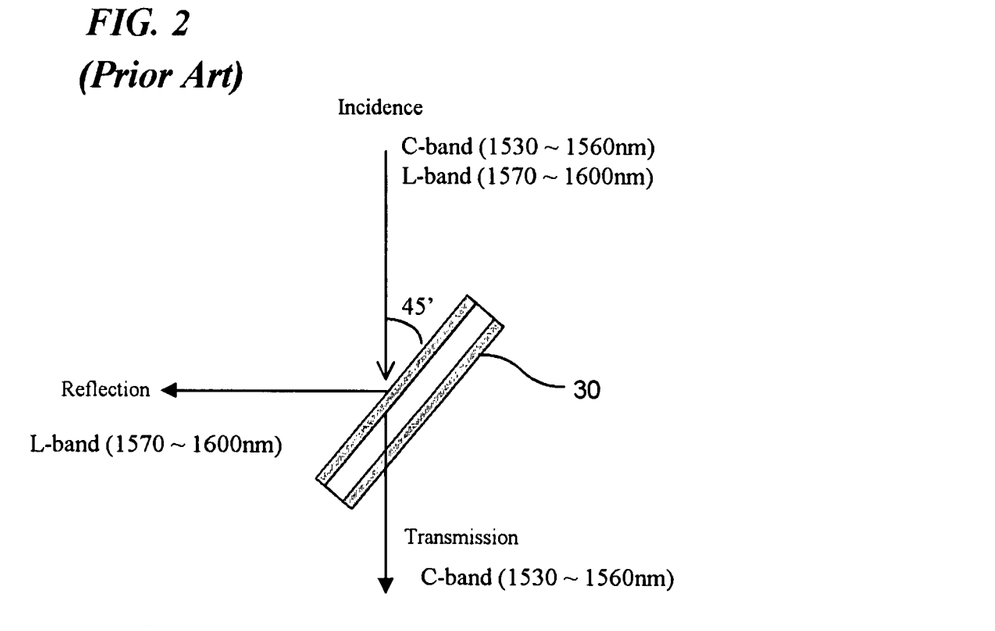
Figure 3:
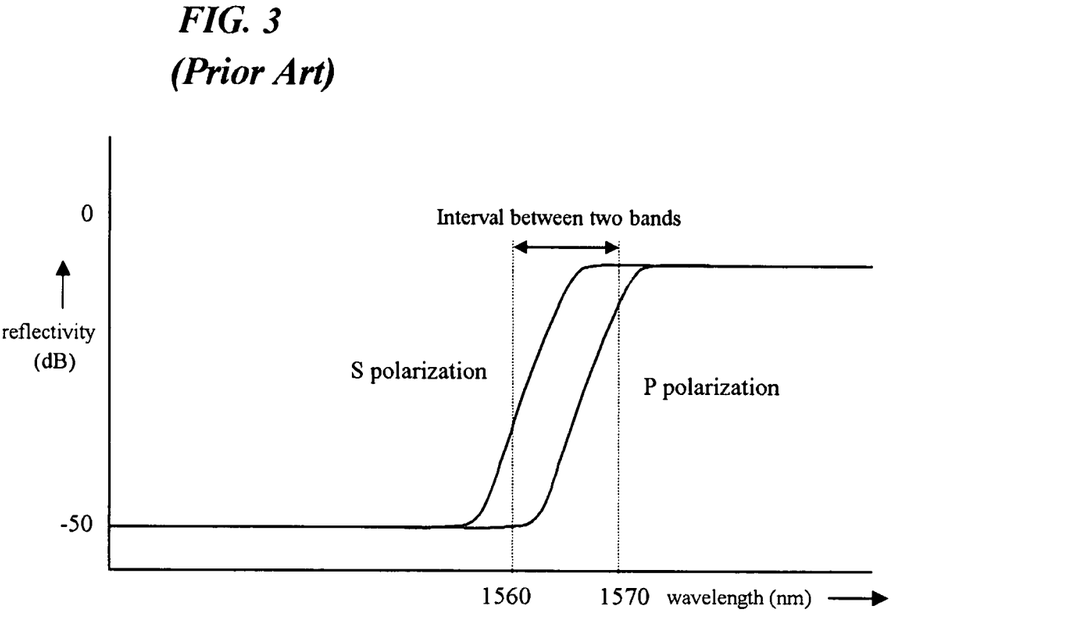

FIGS. 1~3 are conceptual diagrams illustrating a conventional optical bi-directional transceiver module.

The bi-directional transceiver includes an optical transmitter 10 and an optical receiver 20 in a single housing 50. In more detail, the A-wavelength light signal and the B-wavelength light signal pass through the ferrule 40, are transmitted to the A/B band filter 30 having the slope of 45°, and are reflected. The transmitted light signal is incident on the optical transmitter 10, and the reflected light signal is incident on the optical receiver 20.

However, if the incident light is indicative of the C-band having the wavelength of 1530~1560 nm or the L-band having the wavelength of 1570~1600 nm, a difference between the C-band and the L-band is about 10 nm.

In the case of using the C/L band filter 30 of the slope 45°, the difference in reflection characteristics between S-polarization and P-polarization shown in FIG. 3 greatly occurs within the band, such that the transmission and reflection of the C/L band cannot be controlled. As a result, the bi-directional optical transceiver module has the problem of polarization.

If the S-polarization and the P-polarization are different from each other within the wavelength range of 1530~1560 nm (or the wavelength range of 1570~1600 nm) as shown in FIG. 3, the optical reflection characteristics of the corresponding band are distorted according to the polarization, such that it cannot be used as a normal filter.

Therefore, in the case of manufacturing the bi-directional optical transceiver module of FIGS. 1~2, the normal filter characteristic can be acquired only when an interval between two bands (e.g., 1310 nm/1550 nm, C-band/S-band, or C-band/E-band) may be at least several tens of nanometers (nm).

SUMMARY OF THE INVENTION

Therefore, the present invention has been made in view of the above problems, and it is an object of the present invention to provide an optical bi-directional transceiver module which includes an optical transmitter and an optical receiver in a single housing as a single module, and can normally implement bi-directional communication although the light signal having a narrow interval between bands is used.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with one aspect of the present invention, the above and other objects can be accomplished by the provision of an optical bi-directional transceiver module including an optical transmitter, an optical receiver, and an optical filter in a single housing, in which: the optical filter, when an A-band wavelength light signal and a B-band wavelength light signal enter the optical filter contained in the housing, passes the A-band wavelength light signal, and transmits the A-band wavelength light signal to the optical transmitter; the A-band wavelength light signal generated from the optical transmitter returns to an incident path via the optical filter; and the B-band wavelength light signal is reflected in a direction different from the incident path, and is applied to the optical receiver, such that an angle between a vertical axis of the optical filter and the incident light signal is determined in the range from 0° to 20°; the housing further includes a reflection mirror, in which the reflection mirror is arranged at a specific location, at which the B-band wavelength light signal reflected from the optical filter is reflected in a direction perpendicular to the incident path of the light signal incident on the optical filter; and the optical transmitter and the optical receiver are arranged to be perpendicular to each other, in which a distance between the optical receiver and a reflection surface of the reflection mirror is shorter than the shortest distance between the optical receiver and the incident path of the light signal incident on the optical filter, such that the B-band wavelength light signal reflected from the reflection surface does not disturb the light signal incident on the optical filter.

Preferably, the A-band wavelength light signal is a C-band light signal; and the B-band wavelength light signal is an L-band light signal.

Preferably, the A-band wavelength light signal is an L-band light signal; and the B-band wavelength light signal is a C-band light signal.

Preferably, the reflection mirror is coated with gold at a specific part inside of the housing.

Preferably, the A-band wavelength light signal and the B-band wavelength light signal are arranged in parallel to each other, such that the parallel light signals are incident on the optical filter.

Preferably, the housing includes a collimator; and the A-band and B-band wavelength light signals incident on the optical filter are arranged in parallel to each other by the collimator.

Preferably, the housing includes a detachable optical connector, such that the A-band and B-band wavelength light signals incident on the optical filter are arranged in parallel to each other by the detachable optical connector.

Preferably, the optical transmitter includes an injection-mode-locked FP LD, such that an injection operation is executed at the FP LD by the A-band wavelength light signal applied to the optical transmitter, the light signal is amplified, and a single-wavelength light signal is generated from the FP LD.

Preferably, the optical transmitter includes a reflective semiconductor optical amplifier (RSOA), such that an injection modulation is executed at the RSOA by the A-band wavelength light signal applied to the optical transmitter, the light signal is amplified, and a single-wavelength light signal is generated from the RSOA.

In accordance with other aspect of the present invention, the above and other objects can be accomplished by the provision of an optical bi-directional transceiver module including an optical transmitter, an optical receiver, and an optical filter in a single housing, in which: the optical filter, when an B-band wavelength light signal enters the optical filter contained in the housing, reflects the B-band wavelength light signal in a direction different from the incident path, and is applied to the optical receiver, such that an angle between a vertical axis of the optical filter and the incident light signal is determined in the range from 0° to 20°; the A-band wavelength light signal generated from the optical transmitter returns to an incident path via the optical filter; and the B-band wavelength light signal is reflected in a direction different from the incident path.

It is to be understood that both the foregoing general description and the following detailed description of the present invention are exemplary and explanatory and are intended to provide further explanation of the invention as claimed.

BRIEF-DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 4:
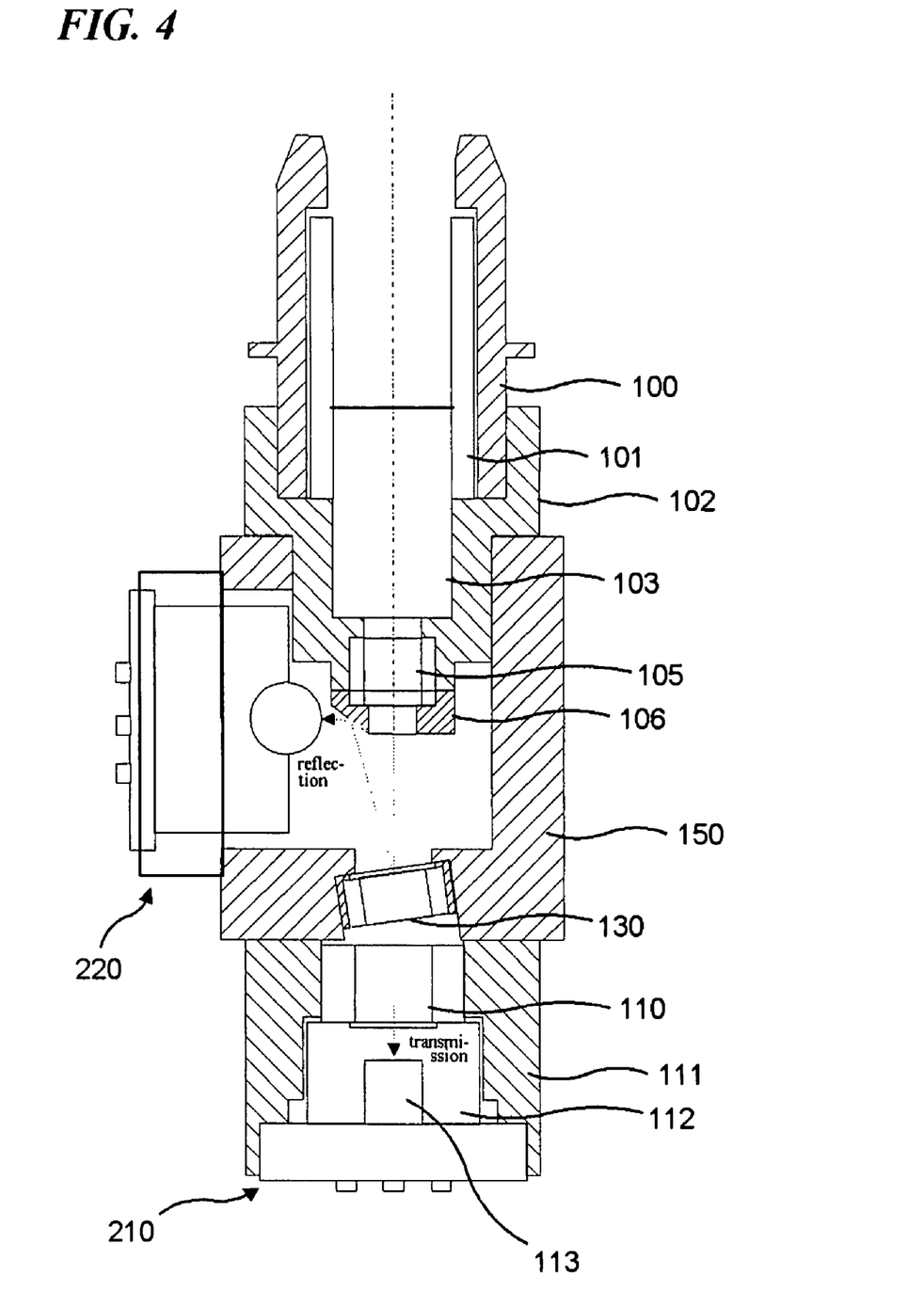
FIGS. 4~6 are conceptual diagrams illustrating an optical bi-directional transceiver module for use in a WDM-PON system according to a first preferred embodiment of the present invention.
Figure 5:
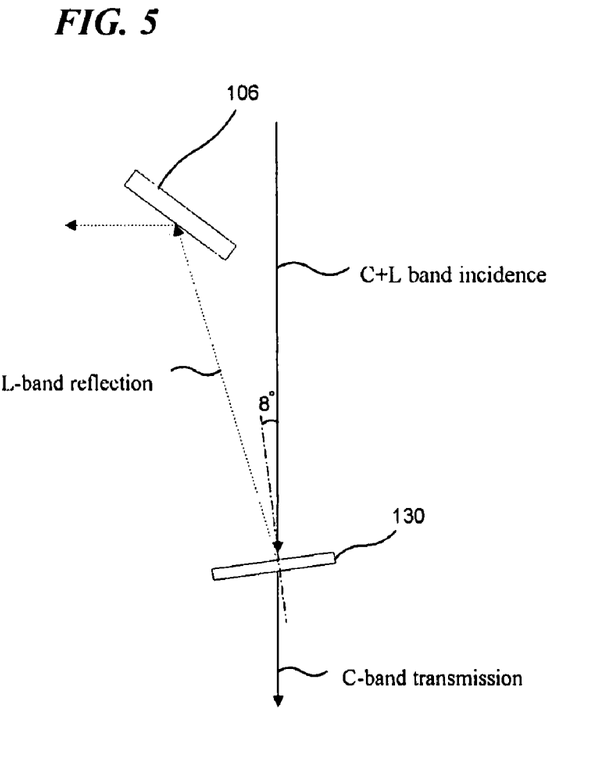
Figure 6:
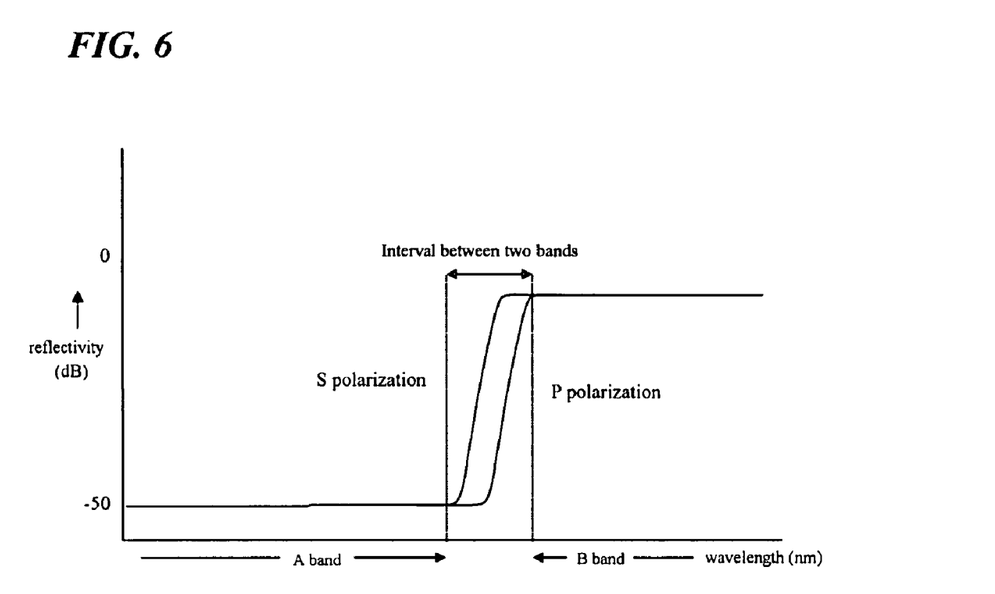

FIGS. 4~6 are conceptual diagrams illustrating an optical bi-directional transceiver module for use in a WDM-PON system according to a first preferred embodiment of the present invention.

As can be seen from FIG. 4, the present invention relates to an integrated-type module package capable of transmitting/receiving optical signals using the C/L band optical communication wavelength.

Referring to FIG. 4, a housing 150 includes an optical transmitter 210, an optical receiver 220, a reflection mirror 106, and a C/L band filter 130.

The SC-type optical-connector group (101, 102, 103, and 105) is detachably connected to the housing 150. The C-band light signal and the L-band light signal are changed to parallel light signals by the above-mentioned SC-type optical-connector group, such that the parallel signal is applied to the C/L band filter 130.

The optical-connector group includes a stub-housing 102 inserted into the housing 140; a stub 103 installed in the stub-housing 102; a sleeve housing 100 inserted into the stub-housing 102; a sleeve 101 installed in the sleeve-housing 100; and an optical filter lens 105 installed in the insertion part of the stub-housing 102. Therefore, the C/L band light signal is applied to the C/L band filter 130 via the optical fiber lens 105.

The C-band light signal from among light signals applied to the C/L band filter 130 is transmitted and is then incident on the optical transmitter 210. The L-band light signal is incident on the optical receiver 210 after being reflected from the reflection mirror 106.

The vertical axis of the C/L band filter 130 is arranged at a specific angle from 0° to 20° on the basis of the incident light signal. For example, the most preferable angle is 8°.

The reason why the angle is limited as stated above is that the transmission and reflection of the C/L bands cannot be controlled at the conventional angle of 45° due to the reflection characteristics caused by polarization.

If the C/L band filter is arranged at 0, all the reflection light signals return to the incident-light path, such that it is difficult to separately receive only the L band.

It is preferable that the optical transmitter 210 and the optical receiver 220 are arranged to be perpendicular to each other, because they must be structurally compatible with the international standard such as the small form factor (SFF) transceiver. Therefore, in order to enable the light signal reflected from the C/L band filter 130 to be perpendicular to the incident light by the reflection mirror 106, the angle of the reflection mirror 106 should be established in association with the C/L band filter 130.

Preferably, the reflection mirror 106 may be coated with gold at a lower part of the stub-housing 102.

If the L-band light signal of the ONU is incident on the optical receiver 22, and the C-band light signal of the ONU is incident on the optical transmitter 210, the optical receiver 220 of the OLT may receive the C-band light signal and the optical transmitter 210 of the OLT may receive the L-band light signal.

The distance between the reflection surface of the reflection mirror 106 and the optical receiver 220 must be shorter than the shortest distance between the optical receiver 220 and the light incident path of the C/L band filter 130. Therefore, the reflection surface of the reflection mirror 106 is arranged at a specific location at which the above-mentioned requirement is satisfied.

In other words, from the viewpoint of the light incident path of the C/L band filter 130, the reflection surface of the reflection mirror 106 and the optical receiver 220 must be located in the same direction. In this case, the L-band light from the reflection surface of the reflection mirror 106 to the optical receiver 220 does hot disturb the light signal incident on the C/L band filter 130.

The injection-mode-locked FP LD 113 is installed at the optical transmitter 210, the C-band light signal generated from the C/L band filter 130 passes through the aspheric lens 110, serves as a single-wavelength light source by the injection locking operation, and is transmitted to the optical fiber via the incident-light path. The FP LD 113 is covered with the LD TO can 112, and is totally installed at the LD housing 111. In the above example, a FP LD was used in the optical transmitter 210, however, a reflective semiconductor optical amplifier (RSOA) may be used instead of the FP LD.

In the case of using the C/L band filter 130 of the slope 0°~20° as shown in FIGS. 4~5, the difference in reflection characteristics between the S-polarization and the P-polarization of FIG. 6 is not greatly generated within the C- or L-band although the interval between the C-band and the L-band is narrow, such that the transmission and reflection of the C/L band can be controlled.

In this way, there is no problem caused by polarization even when an interval between two wavelength bands is very narrow, such that an optical bi-directional transceiver module can be normally manufactured.

Figure 7:
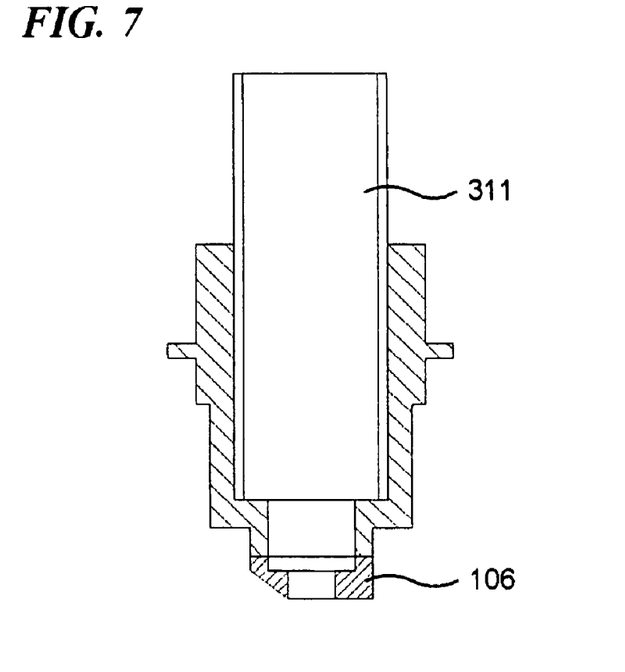
FIG. 7 is a conceptual diagram illustrating an optical bi-directional transceiver module for use in a WDM-PON system according to a second preferred embodiment of the present invention.

FIG. 7 is a conceptual diagram illustrating an optical bi-directional transceiver module for use in a WDM-PON system according to a second preferred embodiment of the present invention. In more detail, FIG. 7 shows a specific case in which a collimator 311 is installed instead of the optical-connector group. In this case, there is no need to additionally install the optical fiber lens 104, and the system structure can be simplified.

Figure 8:
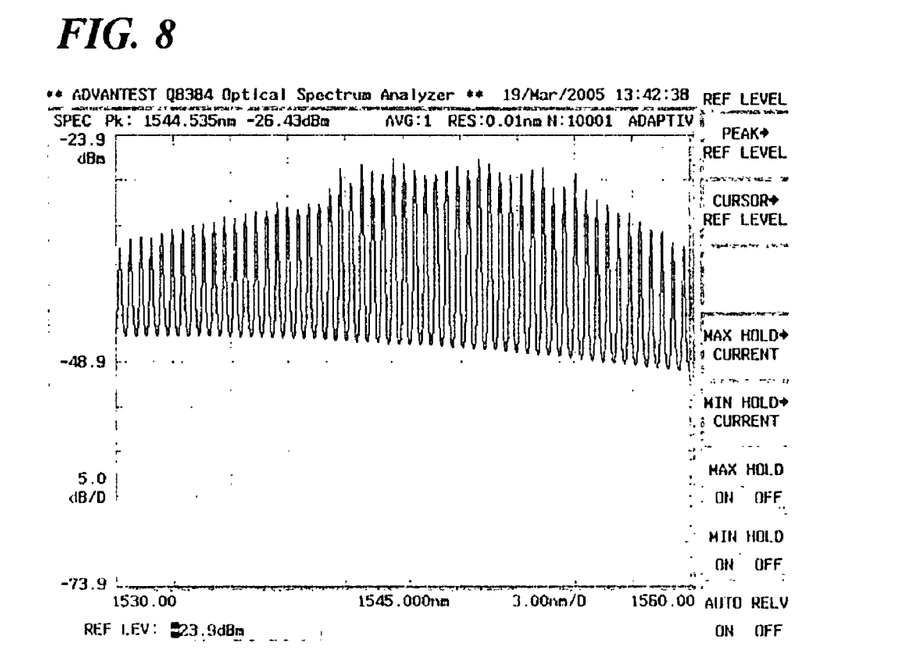
FIGS. 8~9 are conceptual diagrams illustrating the injection-mode-locked effect according to the present invention.
Figure 9:
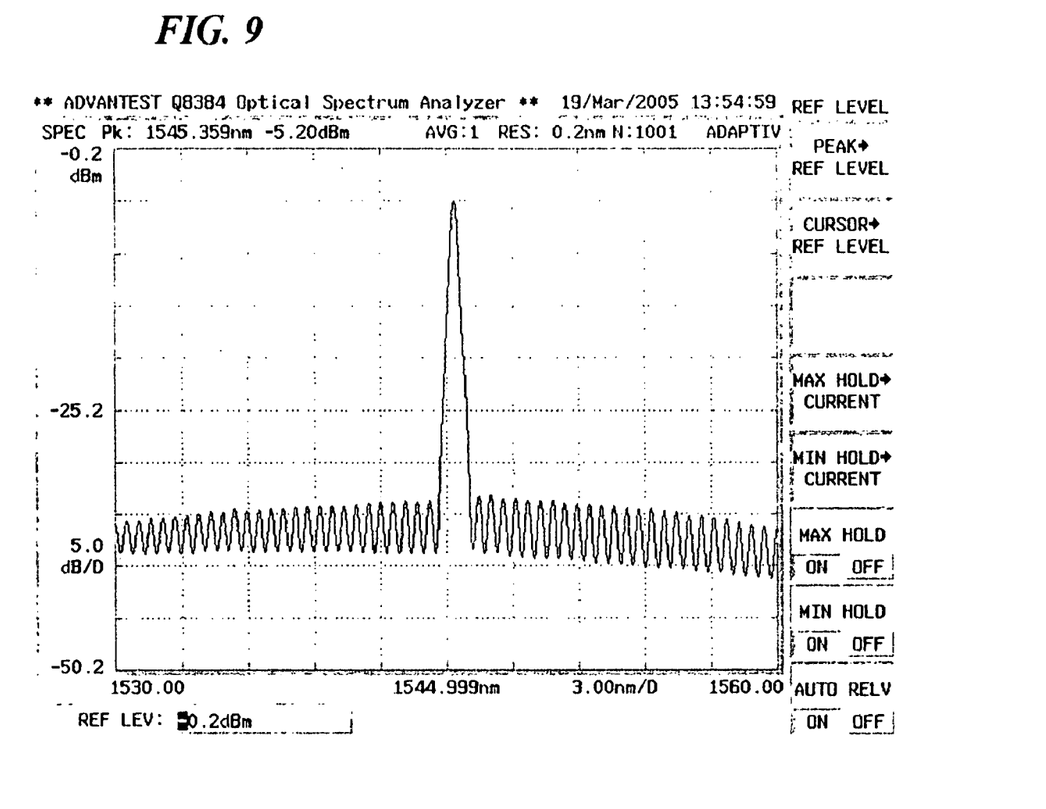

FIGS. 8~9 are conceptual diagrams illustrating the injection-mode-locked effect according to the present invention.

An optical spectrum of the FP LD 113 of FIG. 4 is shown in FIG. 8. As can be seen from FIG. 8, there arises a multiple mode generated in the range from 1520 nm to 1560 nm.

However, if a single-mode light signal of 1545 nm is injected into the FP LD 113, the optical spectrum of FIG. 9 can be acquired. In this case, the optical spectrum of FIG. 9 is amplified by a single wavelength and is then outputted. Therefore, it can be recognized that the injection-mode-locked effect can be normally activated.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

As apparent from the above description, the optical bi-directional transceiver module according to the present invention manufactures a stable optical-communication light source based on the injection-mode-locked FP LD, such that an improved light source capable of substituting for the conventional high-quality DFB laser can be implemented. As a result, the light source for the WDM-PON system can be manufactured. The optical bi-directional transceiver module can be manufactured even when the light signal having a narrow interval between two wavelength bands is used, resulting in reduction of costs, size, and power consumption of the light source.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical bi-directional transceiver module including an optical transmitter, an optical receiver, and an optical filter in a single housing, in which:
   the optical filter, when an A-band wavelength light signal and a B-band wavelength light signal enter the optical filter contained in the housing, passes the A-band wavelength light signal, and transmits the A-band wavelength light signal to the optical transmitter; the A-band wavelength light signal generated from the optical transmitter returns to an incident path via the optical filter; and the B-band wavelength light signal is reflected in a direction different from the incident path, and is applied to the optical receiver, such that an angle between a vertical axis of the optical filter and the incident light signal is more than 0°, and less than or equal to 20°;
   the housing further includes a reflection mirror, in which the reflection mirror is arranged at a specific location, at which the B-band wavelength light signal reflected from the optical filter is reflected in a direction perpendicular to the incident path of the light signal incident on the optical filter; and
   the optical transmitter and the optical receiver are arranged to be perpendicular to each other, in which a distance between the optical receiver and a reflection surface of the reflection mirror is shorter than the shortest distance between the optical receiver and the incident path of the light signal incident on the optical filter, such that the B-band wavelength light signal reflected from the reflection surface does not disturb the light signal incident on the optical filter.

2. The optical bi-directional transceiver module according to claim 1, wherein:
   the A-band wavelength light signal is a C-band light signal; and
   the B-band wavelength light signal is an L-band light signal.

3. The optical bi-directional transceiver module according to claim 1, wherein:
   the A-band wavelength light signal is an L-band light signal; and
   the B-band wavelength light signal is a C-band light signal.

4. The optical bi-directional transceiver module according to claim 1, wherein the reflection mirror is coated with gold at a specific part inside of the housing.

5. The optical bi-directional transceiver module according to claim 1, wherein the A-band wavelength light signal and the B-band wavelength light signal are arranged in parallel to each other, such that the parallel light signals are incident on the optical filter.

6. The optical bi-directional transceiver module according to claim 5, wherein:
   the housing includes a collimator; and
   the A-band and B-band wavelength light signals incident on the optical filter are arranged in parallel to each other by the collimator.

7. The optical bi-directional transceiver module according to claim 5, wherein the housing includes a detachable optical connector, such that the A-band and B-band wavelength light signals incident on the optical filter are arranged in parallel to each other by the detachable optical connector.

8. The optical bi-directional transceiver module according to claim 1, wherein:
   the optical transmitter includes an injection-mode-locked FP LD, such that an injection operation is executed at the FP LD by the A-band wavelength light signal applied to the optical transmitter, the light signal is amplified, and a single-wavelength light signal is generated from the FP LD.

9. The optical bi-directional transceiver module according to claim 1, wherein:
   the optical transmitter includes a reflective semiconductor optical amplifier (RSOA), such that an injection modulation is executed at the RSOA by the A-band wavelength light signal applied to the optical transmitter, the light signal is amplified, and a single-wavelength light signal is generated from the RSOA.

* * * * *